US007215867B2

(12) United States Patent
Noseda et al.

(10) Patent No.: US 7,215,867 B2
(45) Date of Patent: May 8, 2007

(54) CABLE STORAGE DEVICE

(75) Inventors: Iso Noseda, Nottwil (CH); Zane Meredith, Root (CH)

(73) Assignee: Komax Holding AG, Dierikon (CH)

( * ) Notice: Subject to any disclaimer, the term of this patent is extended or adjusted under 35 U.S.C. 154(b) by 11 days.

(21) Appl. No.: 11/262,978

(22) Filed: Nov. 1, 2005

(65) Prior Publication Data

US 2006/0110120 A1 May 25, 2006

(30) Foreign Application Priority Data

Nov. 2, 2004 (EP) .................................. 04405668

(51) Int. Cl.
*G02B 6/00* (2006.01)
*F16L 3/08* (2006.01)

(52) U.S. Cl. ...................... 385/137; 385/134; 385/135; 385/136; 206/499; 248/49; 248/68.1; 248/74.1

(58) Field of Classification Search ........ 385/134–137; 206/499; 248/49, 68.1, 73, 74.1; 269/86, 269/156, 238, 902–903; 29/863
See application file for complete search history.

(56) References Cited

U.S. PATENT DOCUMENTS 4,877,228 A * 10/1989 Ripert ........................ 269/156
5,127,159 A 7/1992 Kudo et al.
5,606,795 A 3/1997 Ohba et al.
6,215,942 B1 * 4/2001 DeMeritt et al. ........... 385/136
2004/0258385 A1 * 12/2004 Kadrnoska et al. ......... 385/136

FOREIGN PATENT DOCUMENTS

EP 0 494 570 7/1992
EP 0584493 B1 3/1994

* cited by examiner

*Primary Examiner*—Frank G. Font
*Assistant Examiner*—Michael P. Mooney
(74) *Attorney, Agent, or Firm*—Venable LLC; Ralph P. Albrecht

(57) ABSTRACT

In order to keep the load on the cables in a cable storage device as light as possible during the process of storing, and furthermore in order to keep the release of the cables as simple as possible, a cable storage device is provided in which at least on one side of the storage device a shoulder of a block is provided, which during storage is pushed down by the cable gripper, and as a result of this during storage the cable or cable end is practically not exposed to any transverse or longitudinal load. In this arrangement the block with the shoulder or shoulders is pushed upward by a spring and in this way ensures reliable clamping action in the storage device.

9 Claims, 5 Drawing Sheets

CABLE STORAGE DEVICE

Figure 1:
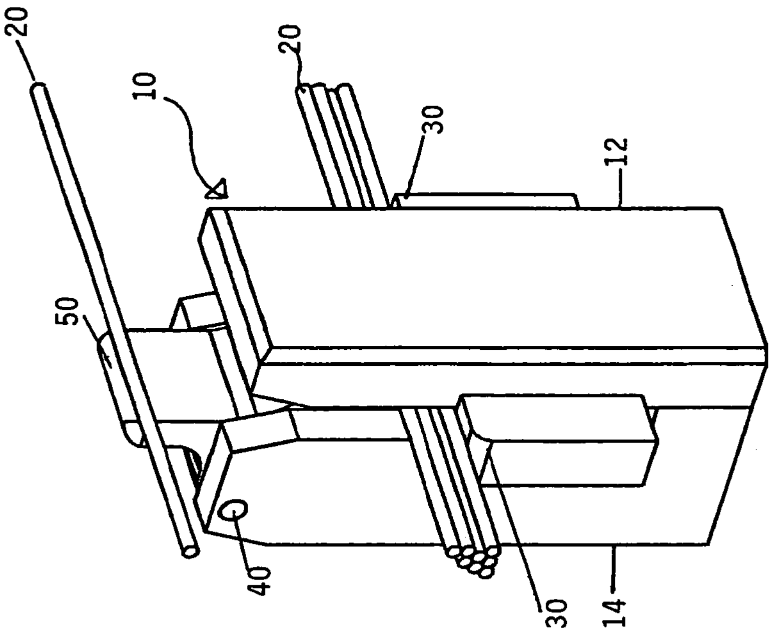

The present invention relates to a device for the storage of cables or cable sections at their ends. In particular the invention relates to such a device in which the cables can not only be transported, but can also easily and practically be conveyed to the process involving further treatment. Furthermore, the invention relates to a method for storing cables, in particular in conjunction with the above-mentioned device.

From U.S. Pat. No. 5,127,159 (e.g. particularly well shown in FIG. 2B thereof), a cable storage device comprising clamping devices arranged side-by-side is known, into which clamping devices the cable ends are to be clamped. However, the cable ends are clamped into the clamping devices such that said cable ends are subjected to quite considerable transverse and longitudinal loads. Furthermore, the cables have to be pulled out; a process which again results in considerable loads on the cable ends, or a special device is required so as to release the cable ends in a way that only involves exposure to light loads.

Furthermore, the cable storage device known from U.S. Pat. No. 5,127,159 is associated with a disadvantage in that a multitude of cable ends can be stored in the same clamping position only while the cable ends are subjected to yet greater loads.

The operation of a cable storage device as described above is known in principle from U.S. Pat. No. 5,606,795, without, however, the above-mentioned problems having been solved therein.

A gripping device for treating cable ends is also known from EP-A-0 494 570 as well as from EP-A-0 584 493.

Known in principle are revolving storage devices, so-called turret storage devices, in which the cable ends typically are arranged circumferentially. Such storage units are particularly well suited to programmed automatic further treatment. However, such turret arrangements are less well suited to manual further treatment.

It is thus the object of the invention to propose a cable storage device in which the load on the cables, in particular during the storage process, is kept as light as possible. Furthermore, the process of releasing the cables should be kept as simple as possible. In this arrangement it should be possible to operate the cable storage device with one of the above-cited known gripping devices. Manual further treatment, namely the removal of the cables from the storage device, must be possible in each and every case.

This object is met by the invention with the use of a device according to claim 1. The measures according to the invention first result in the cable ends not being subjected to any significant mechanical load in particular during the storage of one or of a multitude of cable ends in the same storage unit. Furthermore, in principle, the gripping devices known from EP-A-0 494 570 and EP-A-0 584 493 can be used.

The solution provided by the present invention is convincing above all in that the spring force of the slide which is pushed downward by its shoulder in no way has any influence on the load exerted on the cable during insertion in the storage device. Gentle treatment is of course ensured in particular if only one cable is inserted in one storage device. However, treatment remains gentle even if several cables are inserted.

In particular the removal of the cable or cables by simply pressing the rocker with one finger is also particularly simple and gentle.

The spring force of the slide block influences the clamping force acting on the cable. Closing the locking element, which is designed as a rocker, is in particular determined by the pivot and its spring force.

In a special embodiment of the invention the spring force of the slider can be set so that the cable storage device according to the present invention can be adapted to the various circumstances without the need to change the spring.

The solution provided by the present invention is convincing above all in that it is of lightweight construction, simple and economical to produce. Unlike many cable storage devices according to the state of the art, this cable storage device does not require any compressed air; it is thus ideal for transporting the cables in the storage device.

Further advantageous details of the invention are set out in the dependent claims.

The above-mentioned elements as well as the elements that are to be used according to the invention, which elements are claimed and described in the embodiments below, are not subject to any particular exceptional conditions in relation to their size, shape, use of materials and technical concept so that the selection criteria known in the respective field of application can be applied without any limitations.

Further details, characteristics and advantages of the subject of the invention are presented in the description, below, of the associated drawings which in an exemplary manner explain a device and an associated process sequence relating to the present invention.

Figure 2:
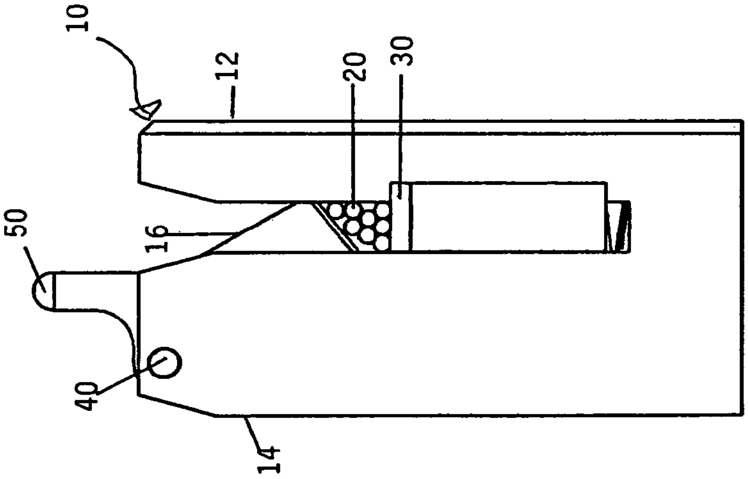
Figure 3:
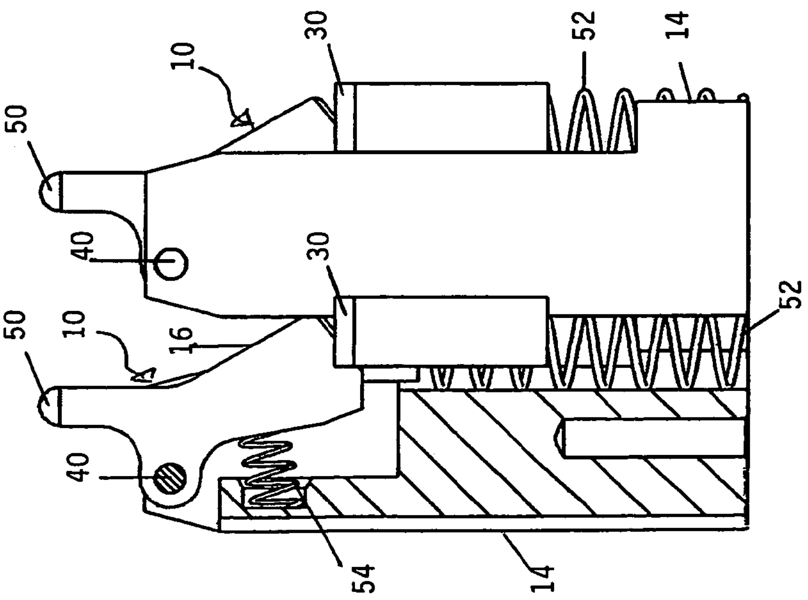
Figure 4:
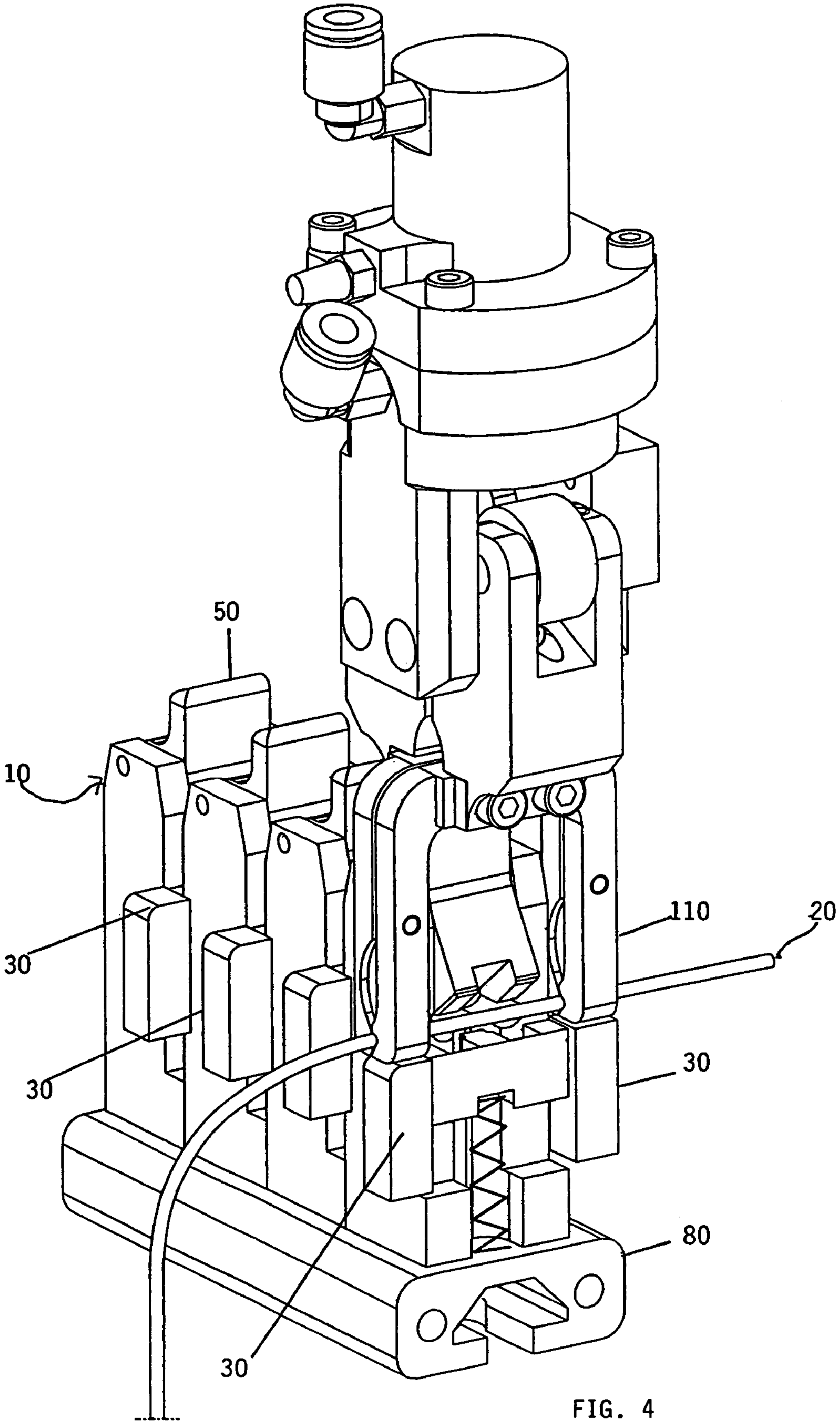
Figure 5:
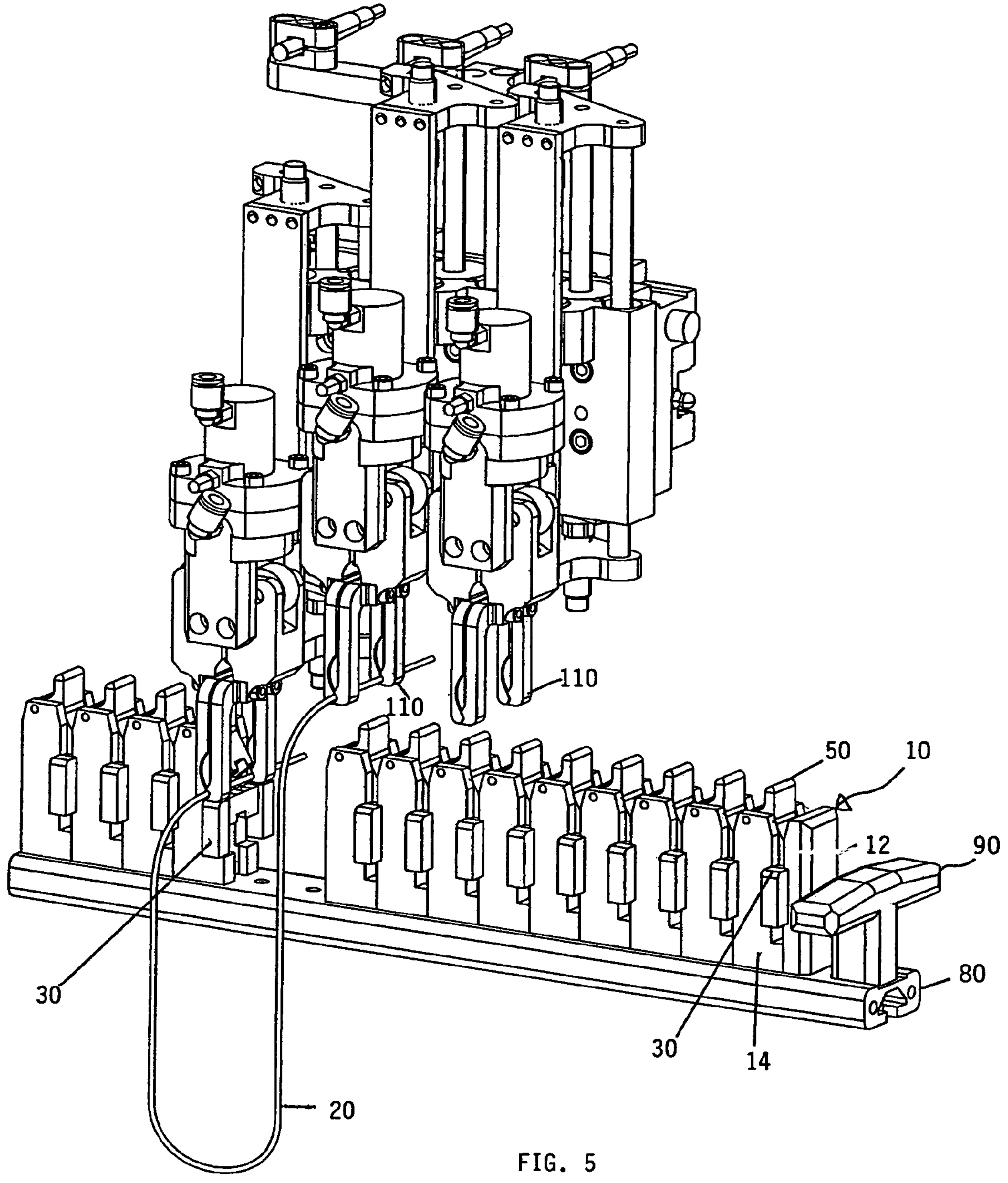
Figure 6:
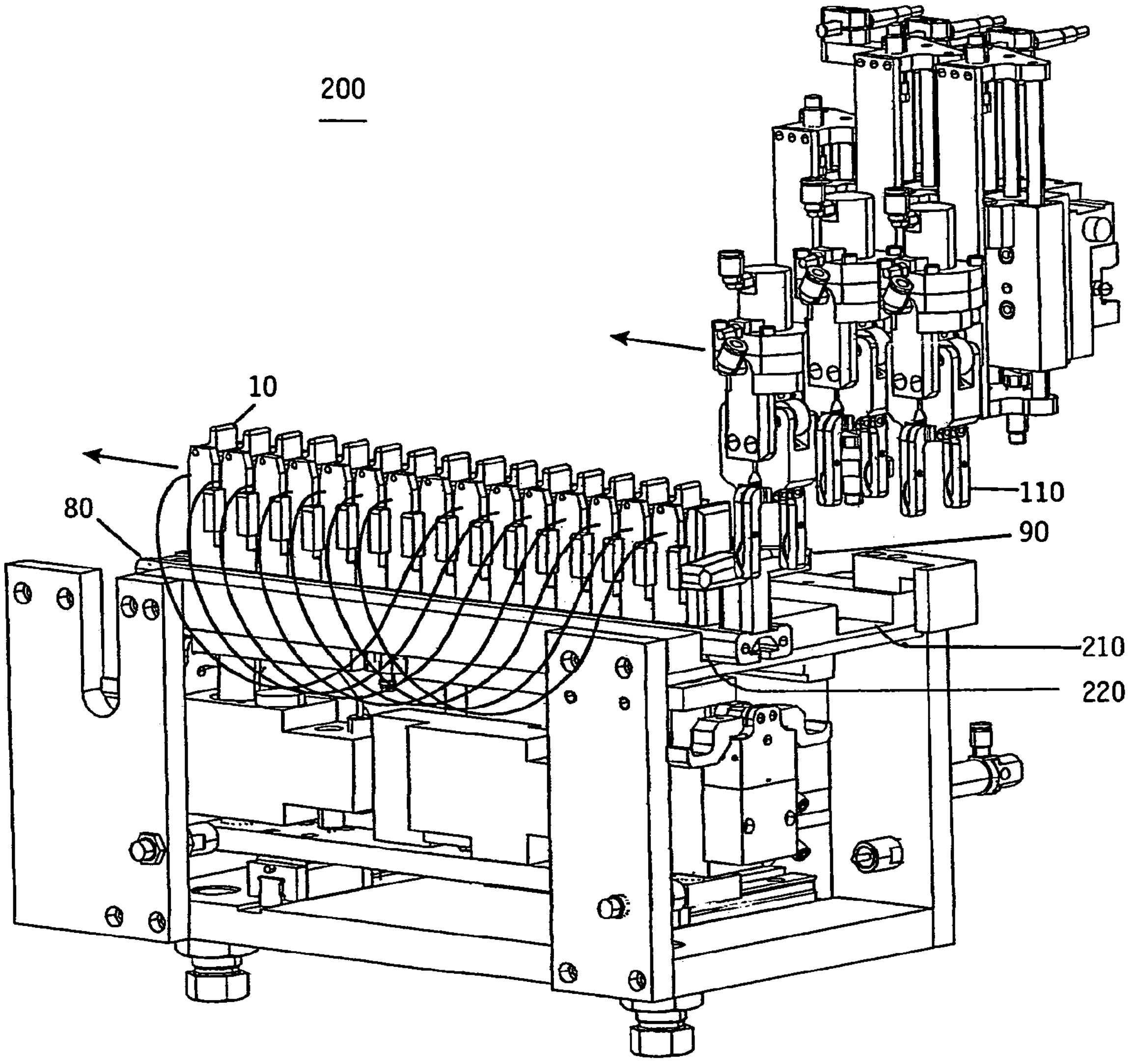
Figure 7:
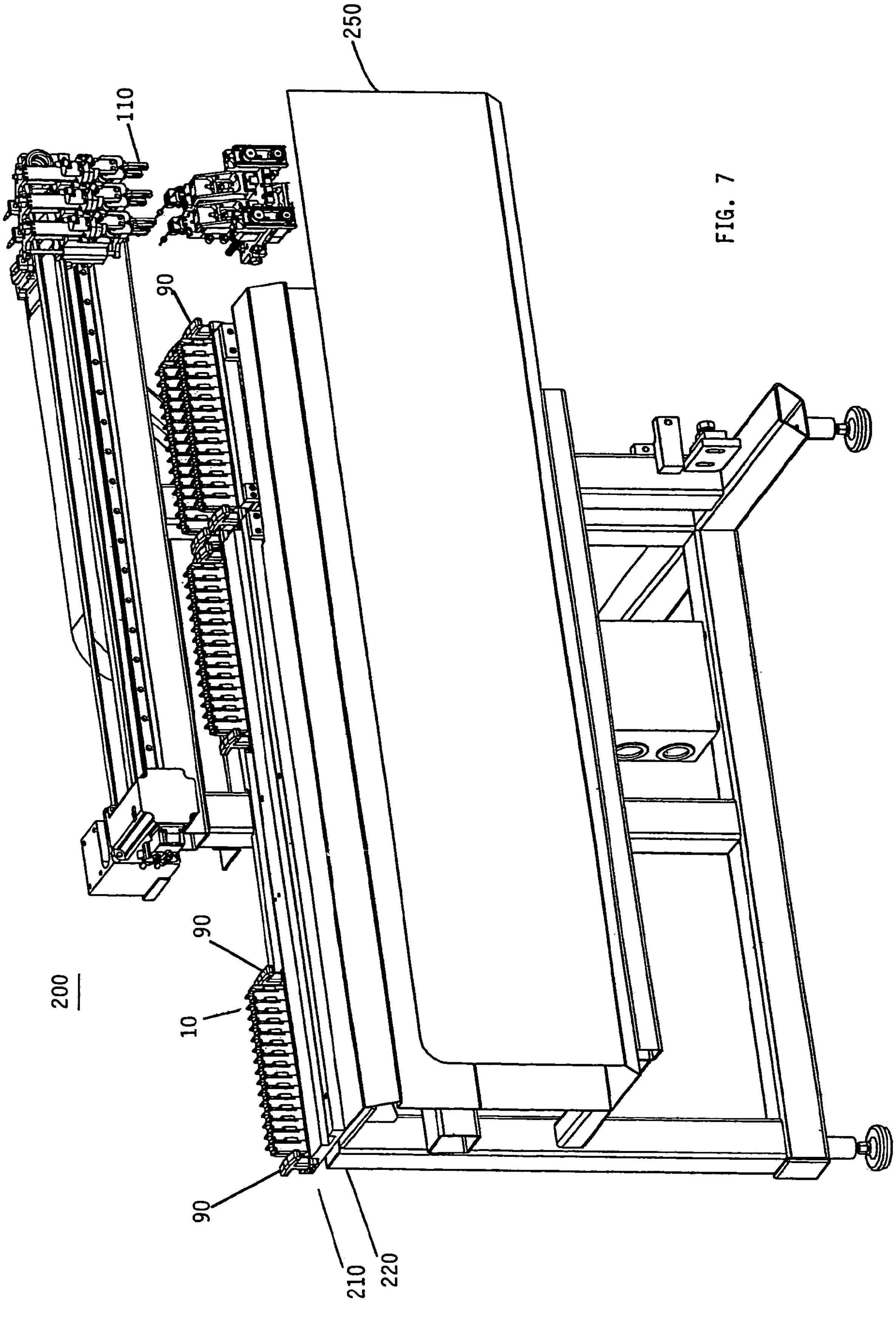

The following are shown in the drawings:

FIG. 1 a perspective view of a cable storage device according to the present invention;

FIG. 2 a lateral view of the cable storage device according to FIG. 1;

FIG. 3 a lateral section view, as a functional drawing, of two cable storage devices according to FIG. 1, arranged side-by-side;

FIG. 4 a multitude of cable storage devices, arranged on a rail, with a gripping device for operating one of the storage devices;

FIG. 5 operation of a gripping device in conjunction with the cable storage devices on several rails;

FIG. 6 a facility for operating the cable storage devices according to FIG. 1 with the essential elements; and FIG. 7 the facility according to FIG. 6 with the cable trough.

The cable storage device which in FIGS. 1 and 2 overall is designated 10 comprises two interconnected lateral parts 12 and 14 which form a gap to accommodate one or a multitude of cables or cable ends 20. Towards the bottom the gap is delimited by a block 30. In this arrangement the block 30 substantially protrudes beyond the length of the lateral parts 12 and 14 and in this way, in the present embodiment, forms a shoulder on both sides. Furthermore, the slide block 30 is designed so as to be vertically sprung; in the embodiment shown this is effected by a spring 52 by which the slide block is held.

Towards the top the gap for the cables can be closed or opened by means of a locking element 16. The locking element 16 is held on an axis 40 in the left lateral part 14 and is pushed against the internal wall of the right lateral part 12 by means of a further spring 54. However, by means of a lever 50 the locking element can be opened and the cables can be released in this way. The average person skilled in the art will recognise that the position of the axis, or the fulcrum, can be significant as far as the force relationships and thus the load acting on the cable or cable end are concerned.

The upper inclined flank of the lock 16 has a steep incline so as to keep the load to which the cable is subjected during insertion as light as possible. In contrast to this, in the present embodiment the bottom flank has an angle of approximately 45° so that, in conjunction with the spring force of the spring 54, the cable or cables is/are firmly held in the cable storage device.

FIG. 3 shows a preferred embodiment of the present invention in which the above-described cable storage elements are placed against each other. In this arrangement the right lateral part of the left storage element shown forms the left lateral part of the right storage element. If there is a multitude of interconnected storage elements, thus only the right terminating element is a lateral part 12.

In FIG. 4 the function of the present invention is shown in particular. Here, a multitude of storage elements 10 are arranged on a rail 80. In this figure the last right-hand lateral part 12 and a further element 14 are not in place so as to better show the function of the device. In this arrangement a gripper 110, which is holding a cable 20, pushes down the shoulders of the block 30, thus freeing a larger storage space. The gripper 110 then releases the cable 20 by opening its gripping elements, and as a result of the block 30 being pushed back the storage space becomes as small again as required by the cable dimension. Of course, a cable or cable end can also be manually inserted in the cable storage device, e.g. in that the shoulder of the slide block is pushed down and the cable thus automatically opens the lock 16, which is designed as a rocker.

This interrelationship is shown again in FIG. 5 at another scale, wherein a multitude of storage elements 10 are shown, which storage elements 10 comprise parts 14 and a terminating part 12. These storage elements are arranged on a rail 80. The rail 80 comprises a handle 90 at each end, which handle basically serves two functions. On the one hand this handle 90 is intended and implemented as a conventional carrying handle for the rails and thus for the multitude of storage elements. A second function of handle 90 is explained in the following with reference to FIGS. 6 and 7.

However, as shown in FIG. 6, the rails 80, into which the individual cable storage devices 10 have been placed, are inserted on a placement facility 200 from the left in the rear row 210. In the present embodiment this is done manually. The rails 80 are then pushed to the right, provided there is room in that position for such a rail 80. If it is the turn of the right-hand rail 80 to receive cables or cable ends 20, this rail 80 is moved to the placement position in a front row 220—in the embodiment shown by being raised, shifted to the front, and lowered—and grippers 110 place cables into it. Thereafter, by means of grippers 110, the rail 80, onto which cables have been placed, can be pushed out towards the left by its handle 90. The embodiment shown provides for three grippers 110, arranged side-by-side, so that the grippers 110 can also supply cable ends with a double-crimp connection. Of course other arrangements of grippers (e.g. two grippers, or more than three grippers) are also possible. As shown in FIG. 7, in front of the front row 220, a cable trough 250 is provided so that the cable loops are protected when they are moved.

This embodiment provides for the cable storage devices on the rail 80 to be manually supplied when the cable storage devices have reached the left-hand position in the front row 220. Of course it is also possible to provide such supply by way of robot technology.

In this embodiment it is particularly advantageous that sliding of the rails 80 in the front row and also in the rear row 220 can be carried out with the grippers 110 in that one of the grippers 110 engages one of the above-described handles 90 that are designed for this purpose and slides the rail 80 by this handle.

The invention claimed is:

1. A device for the storage of cables, in particular cable ends, comprising a storage device body comprising a gap; and a holding means, designed as a clamping means, for holding the cables in the gap, through which holding means in the clamping state a cable space being open in the longitudinal direction of the cables is formed, by which cable space the cables are held, wherein the clamping means comprises a base block, which by a first spring means is pushed into a first direction that is essentially perpendicular to the longitudinal direction of the cables, and further comprises a locking element, wherein the block and the locking element together with the components of the storage device body form the cable space; and wherein the base block at least on one side in longitudinal direction of the cables comprises a shoulder that protrudes beyond the storage device body.

2. The device according to claim 1, wherein the base block comprises shoulders on both sides in longitudinal direction of the cables.

3. The device according to claim 1, wherein the locking element is a snap-on device which by way of a second spring means is pushed in a second direction, which is essentially perpendicular both to the longitudinal direction of the cables and to the first direction.

4. The device according to claim 3, further comprising an operating means for opening the locking element.

5. The device according to claim 1, wherein for the purpose of setting a specific spring force the first spring means is designed so as to be adjustable.

6. A cable storage device made from a multitude of devices according to claim 1, the devices being arranged one behind the other.

7. The cable storage device according to claim 6, wherein the devices for storing the cables are arranged on a rail.

8. The cable storage device according to claim 7, wherein by holding and guiding handles that are designed such that the rails with the cable storage devices can be pushed by their handles in a guide.

9. A method for the storage of cables or cable ends in a storage device, by means of a storage device according to claim 1, wherein a cable gripper, which holds a cable, pushes down the shoulders of a block of the storage device, thus enlarging a storage space; the cable or cable end temporarily opens a locking means of the cable storage device thus enabling the cable or cable end to get into the storage space; the cable or cable end is released by the cable gripper and the cable gripper is lifted, as a result of which the shoulders of the block are released and the storage space is reduced in size such that the cable or cable end is held by clamping action.

* * * * *